United States Patent [19]

Ouchi

[11] Patent Number: 5,270,524
[45] Date of Patent: Dec. 14, 1993

[54] AUTOMATIC DISCRIMINATING AND DECODING APPARATUS

[75] Inventor: Junichi Ouchi, Furukawa, Japan

[73] Assignee: Alps Electric Co., Ltd., Tokyo, Japan

[21] Appl. No.: 846,210

[22] Filed: Mar. 4, 1992

[30] Foreign Application Priority Data

Mar. 13, 1991 [JP] Japan ............................. 3-072045

[51] Int. Cl.$^5$ ............................................ G06K 7/10
[52] U.S. Cl. ................................. 235/462; 235/472; 235/436; 382/65
[58] Field of Search ............ 235/462, 472, 463, 440, 235/436; 250/568; 382/62, 65

[56] References Cited

U.S. PATENT DOCUMENTS

| | | | |
|---|---|---|---|
| 3,832,686 | 8/1974 | Bilgutay | 235/472 |
| 4,743,744 | 5/1988 | Nakase et al. | 235/472 |
| 4,879,456 | 11/1989 | Cherry et al. | 235/462 |

FOREIGN PATENT DOCUMENTS 8802521 4/1988 PCT Int'l Appl. ............... 235/463

*Primary Examiner*—Donald Hajec
*Assistant Examiner*—Esther H. Chin
*Attorney, Agent, or Firm*—Guy W. Shoup; Patrick T. Bever

[57] ABSTRACT

An automatic discriminating and decoding apparatus wherein digital data of a plurality of different systems can be decoded rapidly in a similar period of time. The automatic discriminating and decoding apparatus comprises a plurality of decoders connected commonly to successively receive a set of input digital data and individually capable of decoding digital data of mutually different systems. A plurality of decode memories are individually connected to the decoders for storing decoded data therein, and when the input digital data to the decoders are all decoded by one of the decoders, decoded data are read out from one of the decode memories corresponding to the one decoder and are outputted as an output of the automatic discriminating and decoding apparatus.

5 Claims, 2 Drawing Sheets

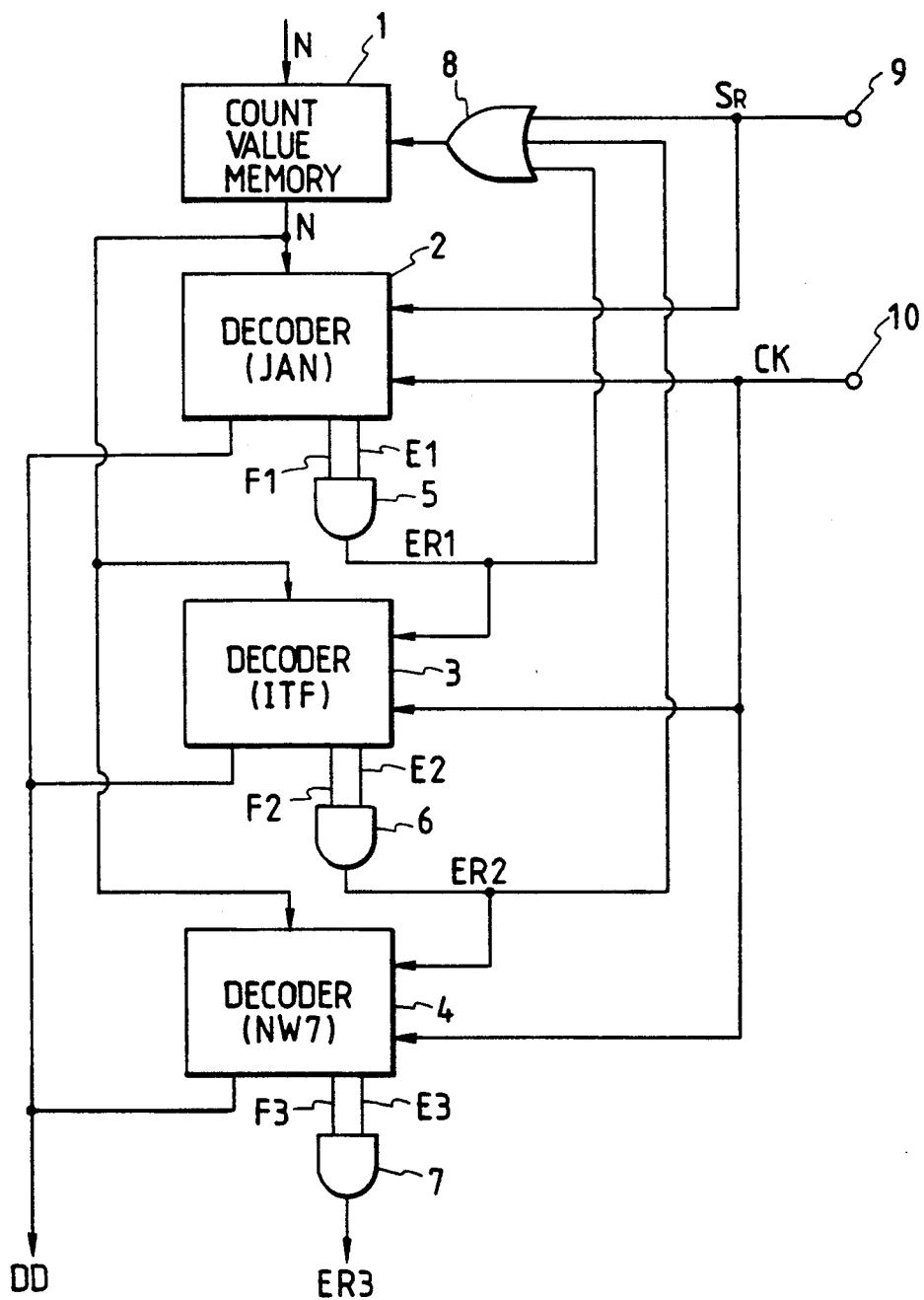

AUTOMATIC DISCRIMINATING AND DECODING APPARATUS

BACKGROUND OF THE INVENTION

1. Field of the Invention

This invention relates to an automatic discriminating and decoding apparatus for automatically discriminating a system of digital data from among a plurality of different systems and decoding the digital data, and more particularly to an automatic discriminating and decoding apparatus which is suitably applied to process bar codes of a plurality of different systems.

2. Description of the Related Art

An equipment in which digital data of a plurality of different systems are processed involves a decoding apparatus which can discriminate and decode digital data of any of the different systems. For example, in an equipment in which bar code information is processed, different bar code systems such as the "JAN", "ITF" and "NW7" systems are used in accordance with a field of application of a bar code, and also a bar code scanner for reading and decoding a bar code can preferably handle bar codes of any of the different systems. A bar code scanner of the type just mentioned is disclosed, for example, in Japanese Patent Laid-Open Application No. 62-10781. An automatic discriminating and decoding apparatus employed in the bar code scanner is shown in FIG. 2.

Referring to FIG. 2, the conventional automatic discriminating and decoding apparatus shown includes a count value memory 1, three decoders 2 to 4, three AND gates 5 to 7 and an OR circuit 8 and has a pair of input terminals 9 and 10.

In operation, when a bar code not shown is read by means of an optical head not shown, a binary signal which presents different levels in accordance with black and white bars of the bar code is obtained, and the binary signal is supplied to a timer counter not shown, by which a count value N representative of a width of each of the bars of the bar code is obtained. The count values N of the successive bars are successively written into the count value memory 1.

After the optical head reads the entire bar code and the count values N of all of the bars of the entire bar code are written into the count value memory 1, a reading start signal SR of the high ("H") level is supplied from the input terminal 9 to the count value memory 1 by way of the OR circuit 8. Consequently, the count value memory 1 reads out the thus written count values N in the order in which they were written. The count values N are supplied to the decoders 2 to 4. Each of the decoders 2 to 4 includes a bit image converter, a bit image memory, a character converter and so forth and processes the count values N from the count value memory 1 to decode the read bar code. Here, it is assumed that the decoder 2 decodes a bar code of the JAN system; the decoder 3 decodes a bar code of the ITF system; and the decoder 4 decodes a bar code of the NW7 system.

Meanwhile, the reading start signal SR is supplied also to the decoder 2 as a starting signal. Consequently, first the decoder 2 starts its decoding operation using a clock signal CK from the input terminal 10. The decoder 2 thus decodes the count values N from the count value memory 1, and when the bar code read is of the JAN system and is successfully decoded, decoded data DD are outputted from the decoder 2. In this instance, the decoder 2 also outputs a decoding end signal E1 to the AND gate 5.

In case the count values N outputted from the count value memory 1 represent a bar code of any bar code system other than the JAN system, the decoder 2 cannot successfully decode the count values N, and when this is detected, the decoder 2 outputs a decoding end signal E1 and simultaneously outputs a decoding failure signal F1 of the "H" level. Consequently, an error signal ER1 of the "H" level is outputted from the AND gate 5. The error signal ER1 is supplied on one hand to the count value memory 1 as a reading start signal by way of the OR circuit 8 and on the other hand to the decoder 3 as a start signal. The count value memory 1 thus starts reading of the count values N thereof from the beginning, and the decoder 3 fetches the count values N and starts its decoding operation.

In case the count values N from the count value memory 1 then represent a bar code of the ITF system, the decoder 3 decodes the count values N. After the count values N are successfully decoded, the decoder 3 outputs decoded data DD and simultaneously outputs a decoding end signal E2 of the "H" level to the AND gate 6. However, when the count values N from the count value memory 1 otherwise represent a bar code of the NW7 system, the decoder 3 cannot successfully decode the count values N and outputs a decoding end signal E2 and a decoding failure signal F2 of the "H" level similarly to the decoder 2. Consequently, an error signal ER2 of the "H" level is outputted from the AND gate 6.

Also the error signal ER2 serves as a reading start signal for the count value memory 1 and a start signal for the next decoder 4 similarly to the error signal ER1. Consequently, reading out of the count value memory 1 is resumed, and the decoder 4 decodes the count values N read out from the count value memory 1. Thus, when a bar code of the NW7 system is read, it is decoded by the decoder 4 so that decoded data DD are obtained.

A bar code of the JAN, ITF or NW7 system is decoded by one of the decoders 2 to 4 in such a manner as described above. While the three decoders 2 to 4 are provided in this manner, when a bar code of some other system than the JAN, ITF and NW7 systems is read, an error signal ER3 is generated from the AND gate 7 in response to a decoding end signal E3 and a decoding failure signal F3 outputted from the last stage decoder 4. Such error signal ER3 can be used to provide a display that the bar code cannot be decoded. If an additional decoder or decoders for bar codes of some other bar code system or systems are connected in a similar connecting relationship to the decoders 2 to 4, then bar codes of an increased number of bar code systems can be decoded by the automatic discriminating and decoding apparatus.

However, the conventional automatic discriminating and decoding apparatus requires a comparatively long interval of time after starting of reading of a bar code till successful decoding of the bar code because a system of the bar code read is discriminated by successive judgments of success or failure in decoding by the decoders 2, 3 and 4.

While information of a name of an article of merchandise, a price or the like is represented by a combination of a plurality of characters such as letters and numerals, a bar code is a representation by an array of bars of a combination of characters representing desired information with each character coded by a combination of a plurality of bars having different widths. While such count values as written into and read out from the count value memory 1 shown in FIG. 2 are numerical data representing widths of the individual bars, when the bar code read is to be decoded from the count values N, it is first judged at any of the decoders 2 to 4 whether each of the count values N represents a thin bar or a thick bar (here, it is assumed that a bar code consists of thin bars and thick bars). The judgment is bit image conversion, and data obtained by such bit image conversion are a bit image which is binary digital data which differ in value between a thin bar and a thick bar. Subsequently, such bit images for one character are combined and are successively compared with combinations of bit images for all characters registered in advance to find out character code data corresponding to the combination of bit images. Such processing is character conversion, and character code data thus obtained are such decoded data DD as described hereinabove.

Such decoding processing as described just above is performed on each of the decoders 2 to 4. Thus, when a bar code of a bar code system other than the JAN system is read, the decoder 2 will generate a decoding end signal E1 and a decoding failure signal F1 since it cannot decode a first character of the bar code. However, those signals E1 and F1 are not generated until after the combination of bit images corresponding to the first character is compared with all of combinations of bit images of characters registered in the decoder 2. Consequently, a long period of time is required for judgment of failure in decoding.

Thus, if it is assumed now that a bar code of the NW7 system is read, it is decoded by the decoder 4 after failure in decoding has been judged successively by the decodes 2 and 3. Accordingly, a long period of time is required after reading of a bar code of the NW7 system till completion of decoding of the bar code. Besides, if it is tried to construct the automatic discriminating and decoding apparatus so that it can read and decode bar codes of a greater number of bar code systems, then as the number of such bar code systems for an object increases, the period of time until decoded data of a bar code are obtained increases as much.

SUMMARY OF THE INVENTION

It is an object of the present invention to provide an automatic discriminating and decoding apparatus wherein digital data of a plurality of different systems can be decoded rapidly in a similar period of time.

In order to attain the object, according to the present invention, there is provided an automatic discriminating and decoding apparatus which comprises a plurality of decoders connected commonly to successively receive a set of input digital data and individually capable of decoding digital data of mutually different systems, a plurality of storage means individually connected to the decoders for storing decoded data therein, and read-out means for reading out, when the input digital data to the decoders are all decoded by one of the decoders, decoded data from one of the storage means corresponding to the one decoder and outputting the decoded data as an output of the automatic discriminating and decoding apparatus.

In the automatic discriminating and decoding apparatus, the decoders are provided individually for the different systems, and when digital data of one of the systems are supplied to the decoders, one of the decoders corresponding to the system of the digital data will successfully decode the digital data. The thus decoded data are once stored into the corresponding storage means, and after such decoding is completed, the decoded data are read out from the storage means and outputted as an output of the automatic discriminating and decoding apparatus. Consequently, the period of time required for decoding of input digital data only depends upon the processing time of the decoder which decodes the digital data. Accordingly, rapid decoding of the digital data is achieved, and decoded data are obtained in a short period of time.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a block diagram showing an exemplary one of conventional automatic discriminating and decoding apparatus.

DETAILED DESCRIPTION OF THE PREFERRED EMBODIMENT

Figure 1:
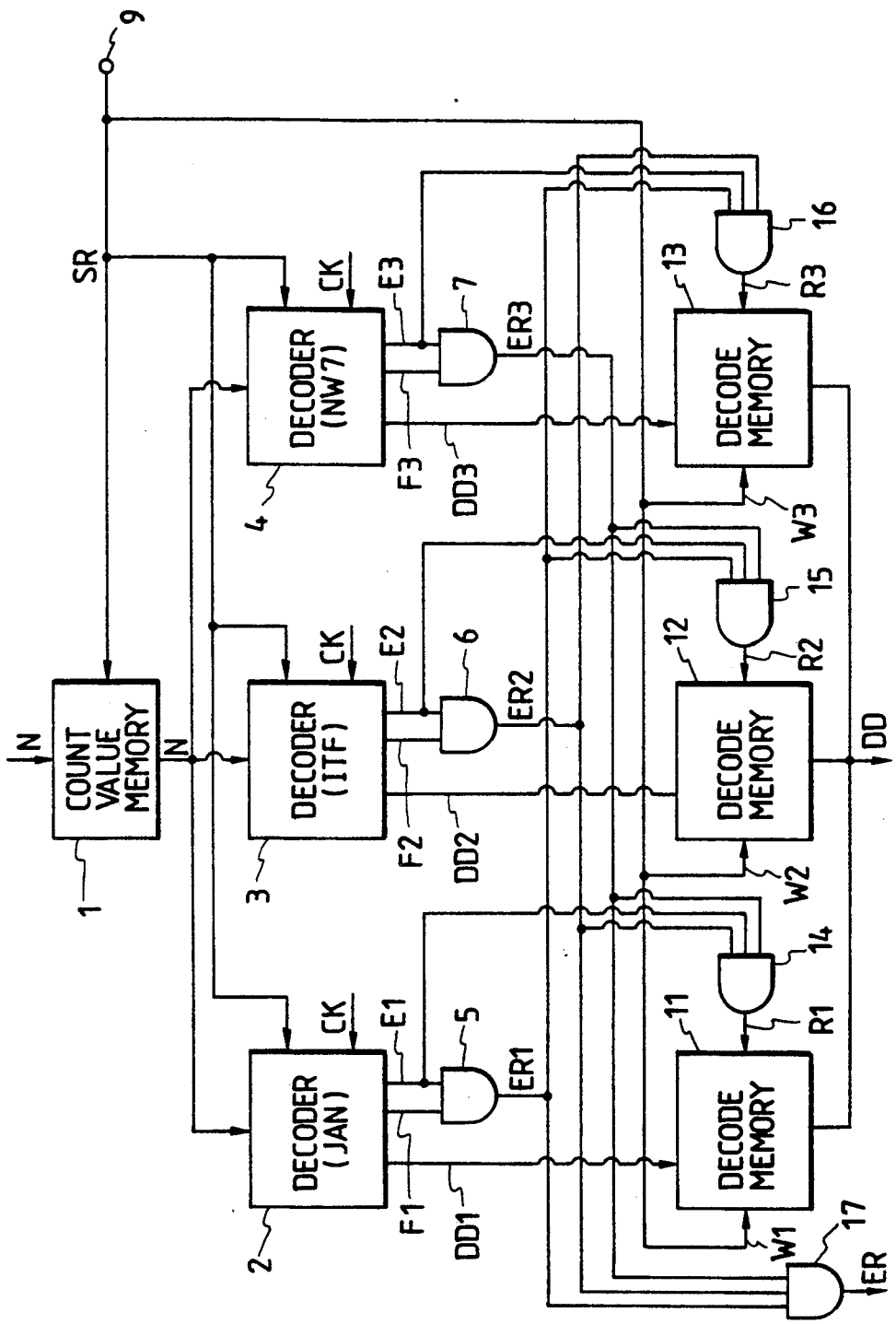
FIG. 1 is a block diagram of an automatic discriminating and decoding apparatus showing a preferred embodiment of the present invention.

Referring to FIG. 1, there is shown an automatic discriminating and decoding apparatus to which the present invention is applied. The automatic discriminating and decoding apparatus shown is applied to a bar code scanner and includes a count value memory 1, three decoders 2 to 4, three AND gates 5 to 7 and an OR circuit 8 similarly to the conventional automatic discriminating and decoding apparatus described hereinabove with reference to FIG. 2. The automatic discriminating and decoding apparatus has an input terminal 9 and additionally includes three decode memories 11 to 13 and four AND gates 14 to 17.

In operation, when a reading start signal SR of the high "H" level is received from the input terminal 9 after count values N for a bar code have been written into the count value memory 1, the count value memory 1 starts reading out of the stored count values N thereof. Meanwhile, the reading start signal SR also serves as a start signal for the decoders 2 to 4, and consequently, the decoders 2 to 4 start to operate in accordance with a clock signal CK. The reading start signal SR further serves as a writing instruction signal for the decode memories 11 to 13, and consequently, the decode memories 11 to 13 enter into a write mode. At the point of time, decoding end signals E1, E2 and E3 of the "H" level and decoding failure signals F1, F2 and F3 of the "H" level are not outputted from the decoders 2, 3 and 4, respectively, and consequently, all of the outputs of the AND gates 5 to 7 present the low ("L") level. As a result, all of the output of the AND gate 14 which receives outputs of the AND gates 6 and 7 and is connected to receive a decoding end signal E1 from the decoder 2, the output of the AND gate 15 which receives outputs of the AND gates 5 and 7 and is connected to receive a decoding end signal E2 from the decoder 3 and the output of the AND gate 16 which receives outputs of the AND gates 5 and 6 and is connected to receive a decoding end signal E3 from the decoder 4 present the "L" level. Also the output of the AND gate 17 which receives outputs of the AND gates 5 to 7 presents the "L" level.

A count value N read out from the count value memory 1 is supplies at a time to the decoders 2 to 4. Now, if it is assumed here that the count value N corresponds to a bar code of the JAN system, then the decoder 2 will successfully decode the count value N and output decoded data DD1, but the decoders 3 and 4 will judge that the count value N of the first character cannot be decoded and will output decoding end signals E2 and E3 of the "H" level and decoding failure signals F2 and F3 of the "H" level, respectively. Consequently, error signals ER2 and ER3 of the "H" level are outputted from the AND gates 6 and 7, respectively. Meanwhile, the decoder 2 is proceeding its decoding operation and does not generate a decoding end signal E1 and a decoding failure signal F1 of the "H" level, and consequently, the output of the AND gate 5 remains at the "L" level. Thus, in this condition, all of the outputs of the AND gates 14 to 16 present the "L" level.

Thus, decoded data DD1 are successively outputted from the decoder 2 and successively written into the decode memory 11 in a write mode. When decoding for one bar code is completed successfully with the decoder 2, the decoder 2 outputs only a decoding end signal E1 of the "H" level. Consequently, while the output of the AND gate 5 remains at the "L" level, all of the inputs to the AND gate 14 are now at the "H" level. Consequently, the AND gate 14 now outputs a reading start signal R1 of the "H" level to the decode memory 11. As a result, the decode memory 11 successively reads out the decoded data DD1 written therein and outputs them as decoded data DD. In this instance, since the input to the AND gates 15 and 16 from the AND gate 5 is at the "L" level, the outputs of the AND gates 15 and 16 present the "L" level. Accordingly, the decoding memories 12 and 13 are not put into a read-out mode.

Alternatively, in case a bar code of the ITF system is read, it will be decoded by the decoder 3. After such decoding is completed successfully, only a decoding end signal E2 is changed over to the "H" level, and while the output of the AND gate 6 remains at the low "L" level, the outputs of the AND gates 5 and 7 are changed over to the "H" level. Consequently, a reading start signal R2 of the "H" level is generated from the AND gate 15 to place the decode memory 12 into a read-out mode, in which decoded data DD2 obtained from the decoder 3 are successively read out from the decode memory 12 to make decoded data DD. Similarly, in case a bar code of the NW7 system is read, it will be decoded by the decoder 4, and after such decoding is completed, a reading start signal R3 of the "H" level is generated from the AND gate 16 to place the decode memory 13 into a read-out mode, in which decoded data DD3 obtained from the decoder 4 are successively read out from the decode memory 13 to make decoded data DD.

In this manner, when the system of a bar code read is one of the JAN, ITF and NW7 systems, the bar code will be successfully decoded by one of the decoders 2 to 4 after starting of reading out of the count value memory 1, and decoded data DD will be obtained upon completion of the decoding operation. Accordingly, the period of time required for decoding depends only upon the decoding time of the decoder 2, 3 or 4 which corresponds to the system of the bar code and decodes the bar code, and whichever one of the JAN, ITF and NW7 systems the bar code belongs, the bar code will be decoded in a similar processing time to that of a bar code scanner constructed for the exclusive use for the bar code system. Consequently, the period of time required for decoding can be reduced significantly comparing with conventional bar code scanners which are used commonly for a plurality of bar code systems.

When a bar code of a bar code system other than the JAN, ITF and NW7 systems is read with the automatic discriminating and decoding apparatus of FIG. 1, or when a bar code is of one of the JAN, ITF and NW7 systems but is not decoded successfully by the decoder 2, 3 or 4 due to an error in reading thereof, error signals ER1 to ER3 of the "H" level are outputted from the AND gates 5 to 7, respectively. Consequently, while reading out of the decode memories 11 to 13 is performed, an error signal ER is simultaneously outputted from the AND gate 17 so that neither of data read out from the decode memories 11 to 13 may be made decoded data DD.

It is to be noted that, while the automatic discriminating and decoding apparatus of the embodiment described above is constructed such that it can decode a bar code of any of the JAN, ITF and NW7 systems, if a set of a decoder, a decode memory and two AND gates is additionally connected in such a manner as in the circuit shown in FIG. 1, then a bar code of an additional bar code system to those described above can be decoded. In this manner, a bar code system to be decoded can be increased readily.

Further, while the automatic discriminating and decoding apparatus of the embodiment of the present invention described above is applied to a bar code scanner, the present invention can be applied to any other system which handles digital data of a plurality of different systems.

Having now fully described the invention, it will be apparent to one of ordinary skill in the art that many changes and modifications can be made thereto without departing from the spirit and scope of the invention as set forth herein.

I claim:

1. An automatic discriminating and decoding apparatus, comprising:
    a plurality of decoders connected commonly to successively receive a set of input digital data and individually capable of decoding digital data of mutually different systems;
    a plurality of first storage means individually connected to said decoders for storing decoded data therein; and
    read-out means for reading out, when the input digital data to said decoders are all decoded by one of said decoders, decoded data from one of said storage means corresponding to the one decoder and outputting the decoded data as an output of said automatic discriminating and decoding apparatus.

2. An automatic discriminating and decoding apparatus according to claim 1, further comprising means for outputting a decoding error signal when the input digital data to said decoders are successfully decoded by none of said decoders.

3. An automatic discriminating and decoding apparatus according to claim 2, wherein each of said decoders produces a decoding failure signal when it finds at a first stage upon reception of the input digital data to said decoders that it cannot decode the digital data, and said decoding error signal outputting means outputs a decoding error signal when it receives such decoding failure signals from all of said decoders.

4. An automatic discriminating and decoding apparatus according to claim 1, wherein each of said decoders produces a decoding end signal when it successfully decodes the input digital data to said decoders, and said read-out means starts, in response to a decoding end signal from one of said decoders, reading out from one of said storage means corresponding to the one decoder.

5. An automatic discriminating and decoding apparatus according to claim 1, further comprising second storage means for receiving and storing a set of input digital data therein, said second storage means being connected commonly to said decoders.

* * * * *